United States Patent [19]
Lim et al.

[11] Patent Number: 5,889,556
[45] Date of Patent: Mar. 30, 1999

[54] METHOD OF AUTOMATICALLY DIVIDING DOMAIN OF MOTION PICTURE USING TIME SPACE SLOPE INFORMATION

[75] Inventors: Young-Kwon Lim; Myoung-Ho Lee; Jae-Gark Choi, all of Daejeon; Gun Bang, Kyunggi-Do; Ji-Sang Yoo, Seoul, all of Rep. of Korea

[73] Assignee: Electronics and Telecommunications Research Institute, Daejeon, Rep. of Korea

[21] Appl. No.: 841,282

[22] Filed: Apr. 29, 1997

[30]  Foreign Application Priority Data

Nov. 28, 1996 [KR] Rep. of Korea ............ 96-59031

[51] Int. Cl.$^6$ ........................................ H04N 1/26
[52] U.S. Cl. ............................ 348/397; 382/243
[58] Field of Search ........................ 348/397, 399, 348/416; 382/243; H04N 7/26

[56]  References Cited

U.S. PATENT DOCUMENTS 5,767,911   6/1998   Boon ............................. 348/401
5,805,221   9/1998   Lee ................................ 348/397

OTHER PUBLICATIONS

*Hierarchial Morphological Segmentation for Image Sequence Coding* by Philippe Salembier and Montse Pardas, IBEE Transactions On Image Processing, vol. 3, No. 5, Sep. 1994.

*Primary Examiner*—Howard Britton
*Attorney, Agent, or Firm*—Cohen, Pontani, Lieberman, Pavane

[57]  ABSTRACT

A method of automatically dividing the domain of a motion picture is disclosed including the steps of: quantizing at least two sequential picture frames, and simplifying the shapes of the quantized picture frames; obtaining time space slope information from the quantized and simplified picture frames; detecting divides of the picture from the time space gradient information, and obtaining the boundaries between the divides, so as to divide the picture into multiple regions; combining neighboring smaller regions using graph theory, to thereby reduce the number of the divided regions; and dividing the regions into a motionless background object and moving objects, using motion information of the combined regions.

4 Claims, 2 Drawing Sheets

METHOD OF AUTOMATICALLY DIVIDING DOMAIN OF MOTION PICTURE USING TIME SPACE SLOPE INFORMATION

BACKGROUND OF THE INVENTION

1. Field of the Invention

The present invention relates to a method of automatically dividing the domain of a motion picture into a motionless background region and moving objects and, more particularly, to a method of automatically dividing the domain of a motion picture into a background region and moving objects, using time space gradient information obtained from at least two sequential picture frames.

2. Discussion of Related Art

In a conventional method of automatically dividing the domain of a motion picture, the motion picture is divided into a region consisting of picture elements whose motions are similar, with regard to only motion information of each picture element, so as to code the motion picture at a higher compression rate. However, each of the divided regions cannot be an individual object. Furthermore, the objects whose motions are insignificant are included in the background region or their neighboring regions when they

SUMMARY OF THE INVENTION

Accordingly, the present invention is directed to a method of automatically dividing the domain of a motion picture that substantially obviates one or more of the problems due to limitations and disadvantages of the related art.

An object of the present invention is to provide a method of automatically dividing the domain of a motion picture into a background region and moving objects, in which divides are detected in a picture using time space gradient information obtained from at least two sequential picture frames so as to divide the picture into multiple regions, and then the divided regions are combined into object which is visually meaningful.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of automatically dividing the domain of a motion picture, includes the steps of: quantizing at least two sequential picture frames, and simplifying the shapes of the quantized picture frames; obtaining time space slope information from the quantized and simplified picture frames; detecting divides of the picture from the time space gradient information, and obtaining the boundaries between the divides, so as to divide the picture into multiple regions; combining neighboring smaller regions using graph theory, to thereby reduce the number of the divided regions; and dividing the regions into a motionless background object and moving objects, using motion information of the combined regions.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 1A and 1B are block diagrams of coding/decoding devices according to the present invention; and FIG. 2 is a flow chart showing a process of automatically dividing the domain of a motion picture according to the present invention.

DETAILED DESCRIPTION OF PREFERRED EMBODIMENT

Reference will now be made in detail to the preferred embodiments of the present invention, examples of which are illustrated in the accompanying drawings.

Figure 1A:
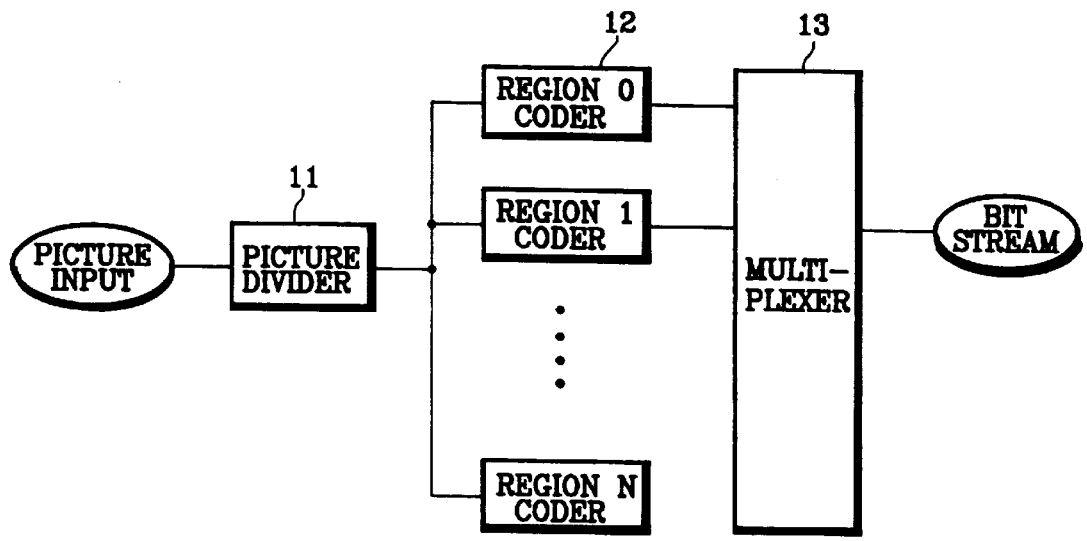
Figure 1B:
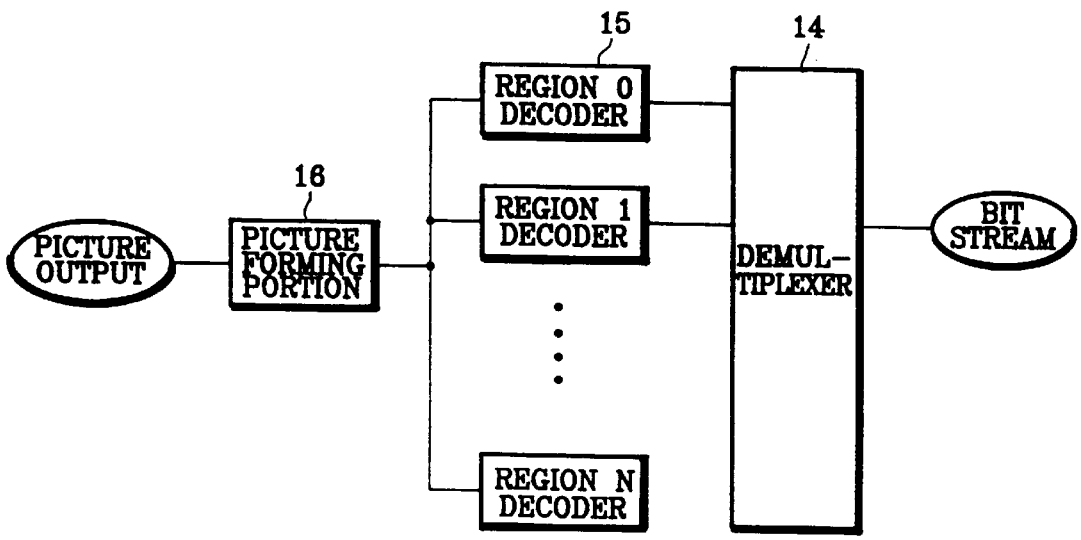

FIGS. 1A and 1B are block diagrams of coding/decoding devices according to the present invention. Referring to FIGS. 1A and 1B, a picture divider 11 divides a picture which is fed thereto into multiple regions according to its contents, and sends signals about the divided regions to a plurality of region coders 12. Each region coder 12 encodes a predetermined signal which is fed thereto, and sends the coded signal to a multiplexer 13. Multiplexer 13 multiplexes the multiple picture signals which are coded by coders 12, and transmits them to a decoder.

A demultiplexer 14 of the decoder demultiplexes the picture signal from multiplexer 13, and sends the picture signal to a plurality of region decoders 15. Each region decoder 15 decodes a picture signal which is applied thereto, and sends the decoded signal to a picture forming portion 16. Picture forming portion 16 re-forms a picture from the picture signals decoded by decoders 15.

Figure 2:
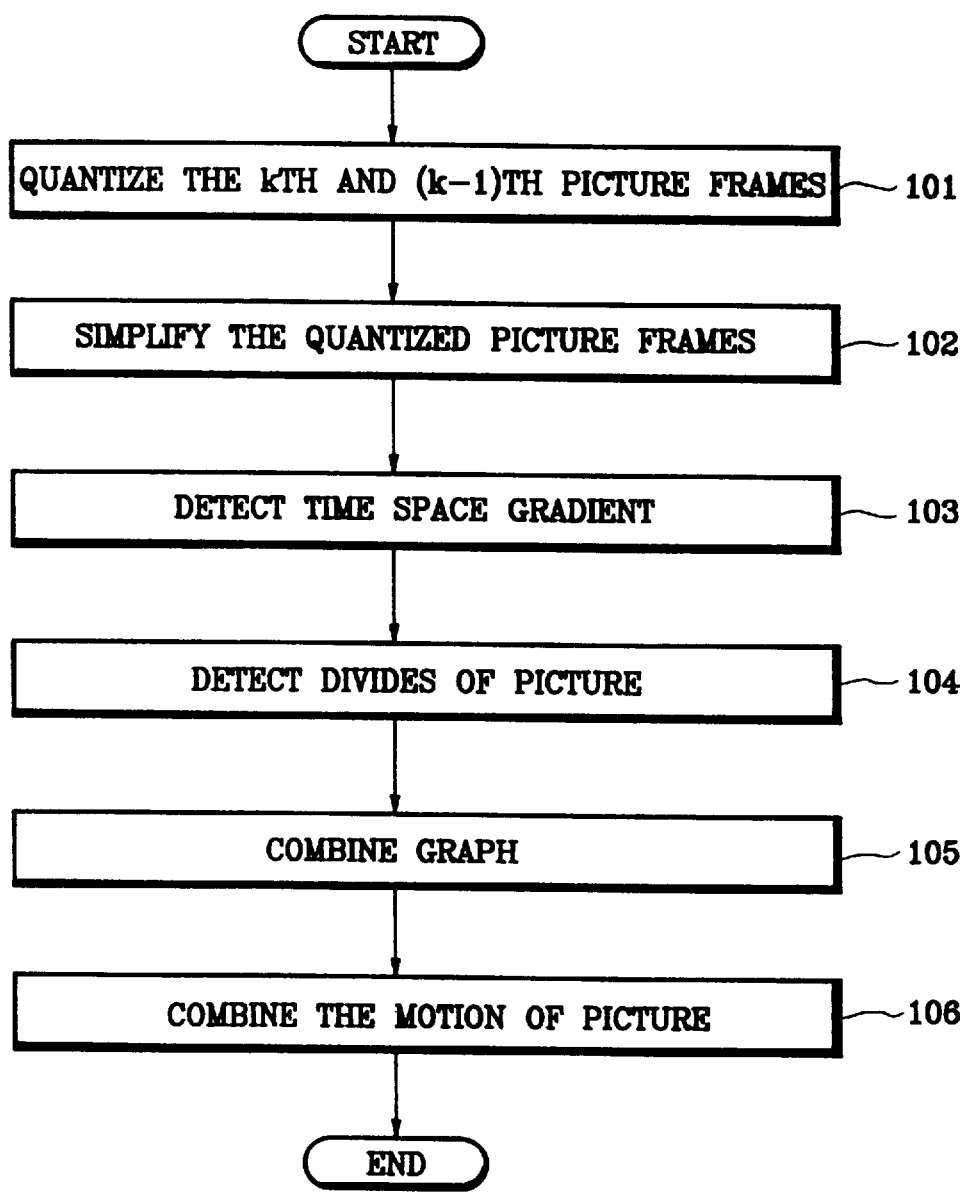

FIG. 2 is a flow chart showing a process of automatically dividing the domain of a motion picture according to the present invention. Referring to FIG. 2, at least two sequential picture frames, that is, (k−1)th and kth picture frames, are quantized through a predetermined quantization. By doing so, the picture frames, which had a complicated histogram, have simple histogram at a step 101.

The complicated shapes of the quantized picture frames are changed into simple shapes using a predetermined filter, and the shape of the object having minute variations becomes simplified at a step 102. Time space gradient information is obtained from each of the quantized and simplified picture frames at a step 103. The time gradient information is obtained using the absolute difference between the picture elements of the two simplified picture frames, and the space gradient information is obtained using a morphological gradient operator.

Divides of the picture are detected from the time space gradient information, boundaries between the divides are obtained, and the picture is divided into regions at a step 104. Neighboring smaller regions are combined using graph theory to reduce the number of divided regions at a step 105. At this step, regions to be combined are decided using the average brightness of the regions and the average sum of absolute difference between the picture elements of two picture frames.

The regions are divided into a motionless background object and moving objects, using motion information of the regions combined through step 105 at a step 106. At this step, the motion information, that is used when the regions are combined, uses the average sum of absolute difference between two picture frames, which is obtained from picture elements other than picture elements located on the boundaries of the regions.

According to the above-described present invention, since the objects, which are visually meaningful and contained in a picture, can be easily divided from the background of the picture, it is possible to code the picture by object. Furthermore, the picture can be edited by divided objects, so that the picture is easily modified and edited.

It will be apparent to those skilled in the art that various modifications and variations can be made in the method of automatically dividing a motion picture of the present invention without departing from the spirit or scope of the invention. Thus, it is intended that the present invention cover the modifications and variations of this invention provided they come within the scope of the appended claims and their equivalents.

What is claimed is:

1. A method of automatically dividing the domain of a motion picture, comprising the steps of:

(a) quantizing at least two sequential picture frames, and simplifying the shapes of the quantized picture frames;

(b) obtaining time space slope information from the quantized and simplified picture frames;

(c) detecting divides of the picture from the time space gradient information, and obtaining the boundaries between the divides, so as to divide the picture into multiple regions;

(d) combining neighboring smaller regions using graph theory, to thereby reduce the number of the divided regions; and (e) dividing the regions into a motionless background object and moving objects, using motion information of the combined regions.

2. The method as claimed in claim 1, wherein the time slope information is obtained using the absolute difference between picture elements of the simplified two picture frames, the time gradient information being obtained using morphological gradient operator.

3. The method as claimed in claim 1, wherein, at step (d), the regions to be combined are decided using average brightness of the regions, and average sum of absolute difference between picture elements of neighboring two picture frames.

4. The method as claimed in claim 1, wherein the motion information uses average sum of absolute difference between two picture frames, which is obtained from picture elements other than picture elements located on the boundaries of the regions.

* * * * *